(12) United States Patent
Kodim

(10) Patent No.: US 8,331,388 B2
(45) Date of Patent: Dec. 11, 2012

(54) CIRCUIT ARRANGEMENT AND METHOD OF OPERATING A CIRCUIT ARRANGEMENT

(75) Inventor: Walter Kodim, Stein (DE)

(73) Assignee: Intel Mobile Communications GmbH, Neubiberg (DE)

( * ) Notice: Subject to any disclaimer, the term of this patent is extended or adjusted under 35 U.S.C. 154(b) by 823 days.

(21) Appl. No.: 11/859,184

(22) Filed: Sep. 21, 2007

(65) Prior Publication Data

US 2008/0080404 A1 Apr. 3, 2008

(30) Foreign Application Priority Data

Sep. 29, 2006 (DE) .......................... 10 2006 046 190

(51) Int. Cl.
*H04L 12/28* (2006.01)
(52) U.S. Cl. ....................................... 370/419; 365/154
(58) Field of Classification Search .................. 370/419; 365/154

See application file for complete search history.

(56) References Cited

U.S. PATENT DOCUMENTS

| 4,138,637 | A | * | 2/1979 | Weinert .......................... 323/354 |
| 5,673,287 | A | | 9/1997 | Colvis et al. |
| 6,700,823 | B1 | * | 3/2004 | Rahman et al. .......... 365/189.05 |
| 6,721,543 | B1 | | 4/2004 | Katsura et al. |
| 2004/0203909 | A1 | * | 10/2004 | Koster ........................ 455/456.1 |
| 2007/0115053 | A1 | * | 5/2007 | Vaisanen .................... 330/124 R |

FOREIGN PATENT DOCUMENTS

| EP | 0 667 684 A1 | 8/1995 |
| EP | 0 741 463 A2 | 11/1996 |
| EP | 0 776 059 A2 | 5/1997 |
| EP | 1 156 582 A2 | 11/2001 |
| WO | WO-01/15362 A1 | 3/2001 |

* cited by examiner

*Primary Examiner* — Robert Wilson
*Assistant Examiner* — Wei Zhao
(74) *Attorney, Agent, or Firm* — Dickstein Shapiro LLP

(57) ABSTRACT

A circuit arrangement and a method of operating a circuit arrangement. The circuit arrangement includes an amplifier having an output port, a duplexer having an input port coupled to the output port of the amplifier and having a combined input/output port to couple to an antenna, and a switch configured to create an impedance load mismatch at the input port of the duplexer independent of the impedance of the output port of the amplifier by acting on a connecting line between the output port of the amplifier and the input port of the duplexer.

25 Claims, 3 Drawing Sheets

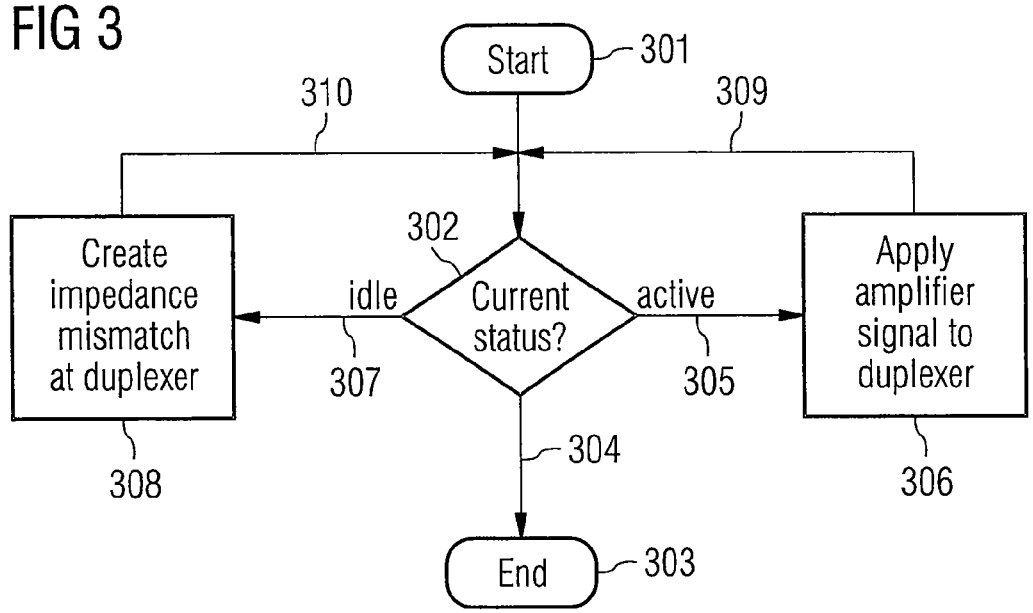
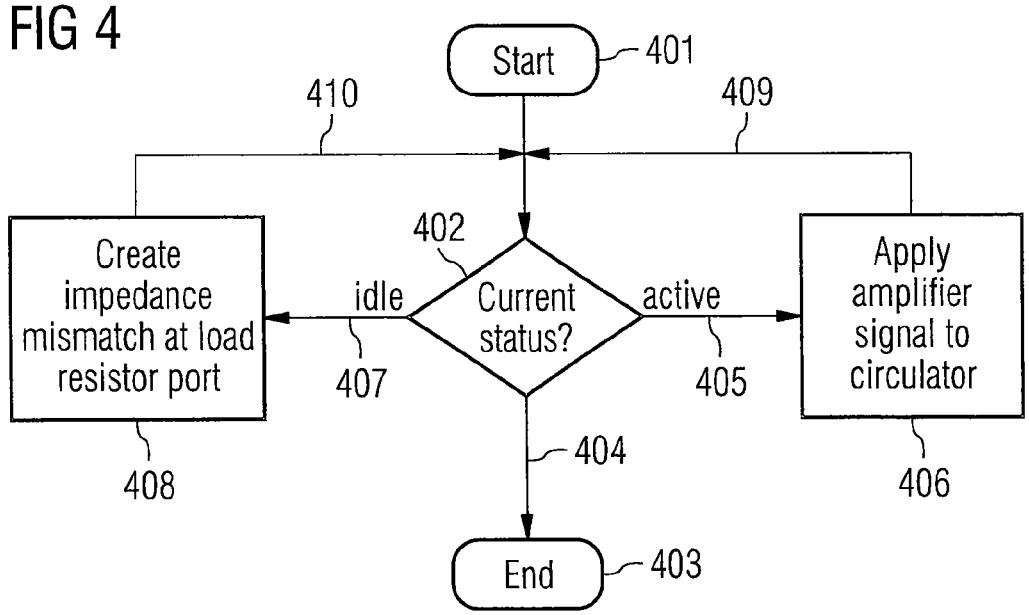

CIRCUIT ARRANGEMENT AND METHOD OF OPERATING A CIRCUIT ARRANGEMENT

CROSS-REFERENCE TO RELATED APPLICATION

This application claims priority to German Patent Application Serial No. 10 2006 046 190.8, which was filed Sep. 29, 2006, and is incorporated herein by reference in its entirety.

TECHNICAL FIELD

The present invention relates to circuit arrangements having an amplifier and a port to couple to an antenna, methods of operating a circuit arrangement having an amplifier and methods of operating a dual mode UMTS/GSM mobile phone.

BRIEF DESCRIPTION OF THE DRAWINGS

FIG. 3 shows a flow chart of one exemplary method of operating a circuit arrangement or a dual mode UMTS/GSM mobile phone, wherein an impedance load mismatch is created at the input port of the duplexer; and FIG. 4 shows a flow chart of another exemplary method of operating a circuit arrangement or a dual mode UMTS/GSM mobile phone, wherein an impedance load mismatch is created at the third port of the circulator.

DETAILED DESCRIPTION OF THE INVENTION

Figure 1:
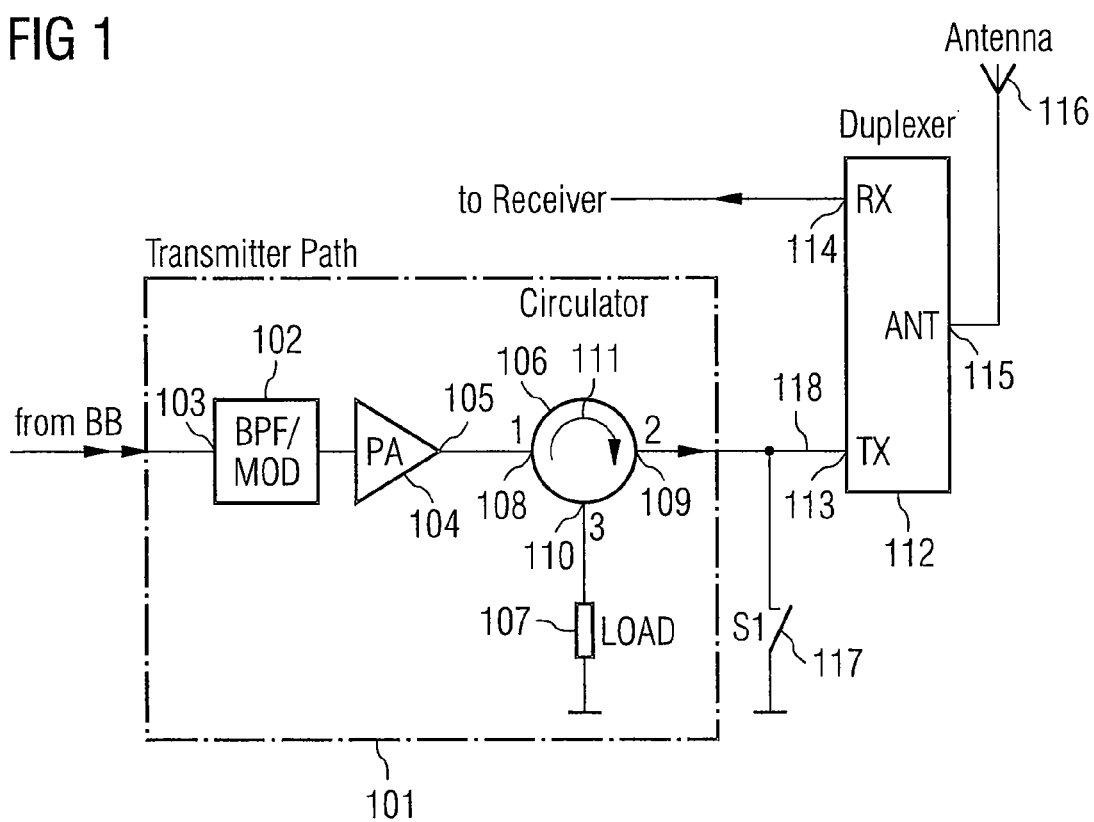
FIG. 1 shows a block diagram of one exemplary circuit arrangement having a switch to create an impedance load mismatch at the input port of the duplexer.

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described below.

When an amplifier is coupled to an antenna for transmitting electromagnetic radiation, it is generally desirable to match the impedances of the amplifier, any coupling circuitry and the antenna. If impedances are matched, some energy from electromagnetic radiation received by the antenna may be absorbed in the amplifier and in the coupling circuitry. Circumstances may occur, where it is useful to have less energy from electromagnetic radiation received by the antenna be absorbed in the circuitry coupled to the antenna.

In accordance with an embodiment of the invention, a circuit arrangement is provided, comprising an amplifier having an output port; a duplexer having an input port coupled to the output port of the amplifier and having a combined input/output port to couple to an antenna; and a switch configured to create an impedance load mismatch at the input port of the duplexer independent of the impedance of the output port of the amplifier by acting on a connecting line between the output port of the amplifier and the input port of the duplexer.

In accordance with an embodiment of the invention, a circuit arrangement is provided, comprising an amplifier having an output port; a duplexer having an input port coupled to the output port of the amplifier and having a combined input/output port to couple to an antenna; and a switch configured to create an impedance load mismatch at the input port of the duplexer independent of the impedance of the output port of the amplifier by acting on a connecting line between the output port of the amplifier and the input port of the duplexer; and further comprising a circulator having a first port coupled to the output port of the amplifier, having a second port coupled to the input port of the duplexer, and having a third port coupled to a load resistor, the load resistor configured to match the impedance of an antenna to couple to the combined input/output port of the duplexer; and wherein the switch is configured to create the impedance load mismatch at the input port of the duplexer by acting on a connecting line between the second port of the circulator and the input port of the duplexer.

In accordance with another embodiment of the invention, a circuit arrangement is provided, comprising an amplifier having an output port; a circulator having a first port coupled to the output port of the amplifier, having a second port to couple to an antenna, and having a third port coupled to a load resistor, the load resistor configured to match the impedance of an antenna to couple to the second port of the circulator; and a switch configured to create an impedance load mismatch at the third port of the circulator independent of the impedance of the load resistor by acting on a connecting line between the load resistor and the third port of the circulator.

In accordance with an embodiment of the invention, a circuit arrangement is provided, comprising an amplifier having an output port; a circulator having a first port coupled to the output port of the amplifier, having a second port to couple to an antenna, and having a third port coupled to a load resistor, the load resistor configured to match the impedance of an antenna to couple to the second port of the circulator; and a switch configured to create an impedance load mismatch at the third port of the circulator independent of the impedance of the load resistor by acting on a connecting line between the load resistor and the third port of the circulator; and further comprising a duplexer having an input port coupled to the second port of the circulator and having a combined input/output port to couple to an antenna.

In accordance with various embodiments of the invention, the switch may be configured to create an impedance load mismatch by opening a connecting line. The term "opening" shall be understood as to include that the series resistance of the connecting line may be switched to any higher value high enough to create an impedance load mismatch.

In accordance with various embodiments of the invention, the switch may be configured to create an impedance load mismatch by grounding a connecting line. The term "grounding" shall be understood as to include that the resistance between the connecting line and electrical ground may be switched to any lower value low enough to create an impedance load mismatch.

In accordance with various embodiments of the invention, a circuit arrangement is provided, wherein the amplifier is configured, if it is in an active state, to match the impedance of an antenna to couple to the second port of the circulator, and, if it is in an idle state, to create an impedance load mismatch at the first port of the circulator.

In accordance with various embodiments of the invention, the amplifier may be a power amplifier in the transmitter path of a wireless communication device.

In accordance with various embodiments of the invention, a circuit arrangement configured to operate in an UMTS mobile phone is provided.

In accordance with various embodiments of the invention, a circuit arrangement is provided, configured to operate in an UMTS portion of a dual mode UMTS/GSM mobile phone, the mobile phone comprising at least one dedicated antenna for each the UMTS portion and a GSM portion.

In accordance with various embodiments of the invention, the duplexer may be a receive/transmit duplexer in a wireless communication device.

In accordance with another embodiment of the invention, a method is provided of operating a circuit arrangement having an amplifier, a duplexer and a switch, comprising: If the amplifier is in an active state, applying a signal from an output port of the amplifier with matching impedance load to an input port of the duplexer; and if the amplifier is in an idle state, creating an impedance load mismatch at the input port of the duplexer independent of the impedance of the output port of the amplifier by switching the switch and thereby acting on a connecting line between the output port of the amplifier and the input port of the duplexer.

In accordance with an embodiment of the invention, a method is provided of operating a dual mode UMTS/GSM mobile phone having at least one dedicated antenna for each an UMTS portion and a GSM portion, having a power amplifier in a transmitter path of the UMTS portion and having a receive/transmit duplexer in the UMTS portion, comprising: If the amplifier is in an active state, applying a signal from an output port of the amplifier with matching impedance load to an input port of the duplexer, and applying a signal from a combined input/output port of the duplexer to the dedicated UMTS antenna; and if the amplifier is in an idle state, creating an impedance load mismatch at the input port of the duplexer independent of the impedance of the output port of the amplifier by switching a switch and thereby acting on a connecting line between the output port of the amplifier and the input port of the duplexer. The term "GSM" shall include GPRS and EGPRS systems as well.

In accordance with various embodiments of the invention, a connecting line between the output port of the amplifier and the input port of the duplexer may be opened by switching a switch. The term "opened" shall be understood as to include that the series resistance of the connecting line may be switched to any higher value high enough to create an impedance load mismatch.

In accordance with various embodiments of the invention, a connecting line between the output port of the amplifier and the input port of the duplexer may be grounded by switching the switch. The term "grounded" shall be understood as to include that the resistance between the connecting line and electrical ground may be switched to any lower value low enough to create an impedance load mismatch.

In accordance with another embodiment of the invention, a method is provided of operating a circuit arrangement having an amplifier, a circulator and a switch, comprising: If the amplifier is in an active state, applying a signal from an output port of the amplifier to a first port of the circulator and through the circulator to a second port of the circulator, whereby the second port is configured to couple to an antenna and a third port of the circulator is coupled to a load resistor configured to match the impedance of an antenna to couple to the second port of the circulator; and if the amplifier is in an idle state, creating an impedance load mismatch at the third port of the circulator independent of the impedance of the load resistor by switching the switch and thereby acting on a connecting line between the load resistor and the third port of the circulator.

In accordance with an embodiment of the invention, a method is provided of operating a dual mode UMTS/GSM mobile phone having at least one dedicated antenna for each an UMTS portion and a GSM portion, and having a power amplifier and a circulator in a transmitter path of the UMTS portion, comprising: If the amplifier is in an active state, applying a signal with matching impedance load from an output port of the amplifier to a first port of the circulator, through the circulator to a second port of the circulator and from the second port to the UMTS antenna, whereby a third port of the circulator is coupled to a load resistor configured to match the impedance of the UMTS antenna; and if the amplifier is in an idle state, creating an impedance load mismatch at the third port of the circulator independent of the impedance of the load resistor by switching a switch and thereby acting on a connecting line between the load resistor and the third port of the circulator. The term "GSM" shall include GPRS and EGPRS systems as well.

In accordance with various embodiments of the invention, a connecting line between the load resistor and the third port of the circulator may be opened by switching a switch. The term "opened" shall be understood as to include that the series resistance of the connecting line may be switched to any higher value high enough to create an impedance load mismatch.

In accordance with various embodiments of the invention, a connecting line between the load resistor and the third port of the circulator may be grounded by switching the switch. The term "grounded" shall be understood as to include that the resistance between the connecting line and electrical ground may be switched to any lower value low enough to create an impedance load mismatch.

In accordance with various embodiments of the invention, a method is provided, further comprising: If the amplifier is in an idle state, creating an impedance load mismatch at the first port of the circulator by switching the output port of the amplifier to an impedance not matching the antenna to couple or being coupled.

In dual receiver concepts which for example are needed for mobile phones care has to be taken of a possible interaction of the receivers. Dual receiver concepts require either a special antenna switch configuration to connect the two receivers/transmitters, e.g. dedicated for UMTS and GSM operation, respectively, to a single antenna or require two single antennas to connect the respective receiver/transmitter combination individually. The latter is called a dual antenna concept. Especially in the case of a dual antenna concept for a UMTS/GSM mobile phone the dual mode architecture has to take into account, that the UMTS2100 frequency band is contiguous or even overlapping with the GSM1800/GSM1900 frequency bands.

In a UMTS/GSM mobile phone a duplexer may be included in the signal path between the UMTS transmitter and the UMTS receiver on one side and the UMTS antenna on the other side. A duplexer or duplex filter is a three-port device that includes a transmit band pass filter and a receive band pass filter. The duplex filter allows the radio to simultaneously transmit and receive on a single antenna. Thus simultaneous transmission and reception of UMTS signals is facilitated.

Due to the linear modulation scheme of UMTS a linear amplification is needed in the UMTS transmit path. Linearity may be adversely affected by a poor and variable VSWR (voltage standing wave ratio) which is often present in mobile phone transmitter-antenna configurations. In order to eliminate the effect of poor and variable VSWR at the amplifier output, a circulator or isolator may be included in the transmit path between amplifier and antenna or between amplifier and duplexer, respectively.

A circulator is a passive device with three or more ports, where power is transferred from one port to the next in a prescribed order. That means for a three-port circulator: Power entering port 1 leaves port 2, port 3 is decoupled; power entering port 2 leaves port 3, port 1 is decoupled; and power entering port 3 leaves port 1, port 2 is decoupled. An isolator is a passive two-port device, where power is transmitted in one direction and absorbed in the other direction. If a matched load (e.g. a load resistor with matching impedance) is connected to port 3 of a three-port circulator, the circulator can be considered as an isolator where power entering port 1 is transmitted to port 2 while power entering port 2 is absorbed and thus not transmitted to port 1.

In a dual antenna UMTS/GSM mobile phone there may be operation modes, where reception in the UMTS2100 frequency band and transmission or reception in the GSM1800/GSM1900 frequency bands takes place simultaneously. Since the UMTS2100 frequency band is contiguous or even overlapping with the GSM1800/GSM1900 frequency bands, some coupling between the antennas may occur if the antenna isolation is insufficient. Coupling should be avoided as it may degrade the antenna efficiency and thus deteriorate the signal quality.

Due to physical restrictions in today's small mobile phone designs, where only limited space is available, the distance between two antennas will always be close or even within the antenna near field region, making it almost impossible to consider two antennas to be independent of each other if operating at contiguous or overlapping frequency bands. The feeding points of a UMTS antenna and a GSM antenna may e.g. be separated only 3 cm apart, leading to significant impact on antenna efficiency due to low antenna isolation. For that case measurement results have indicated that antenna isolation is as low as about 8 dB at UMTS2100 and GSM1800/GSM1900 frequencies. This means that the efficiency of a first antenna may degrade by about 16% simply due to the presence of a second antenna. This is undesirable as "electrical small" antennas do not exhibit exceptional good efficiency anyway.

If the circuitry connected to the UMTS antenna represents a reasonable matched impedance load over a frequency range including GSM1800 RX or GSM1900 TX/RX frequencies, energy radiated from the GSM antenna and picked up by the UMTS antenna will be absorbed in that load and contribute to the loss of the GSM antenna and therefore reduce antenna efficiency. The UMTS2100 frequency band transmit path may represent such a matched impedance load.

The loss of antenna efficiency of a first antenna (e.g. GSM) due to a second antenna (e.g. UMTS) can be substantially reduced if the second antenna behaves as a parasitic radiator to the first antenna such that the radiation energy received by the second antenna is substantially being re-radiated rather than absorbed in the electrical circuit connected to the second antenna. This can be achieved by a reflective termination, where the second antenna is terminated with an impedance that represents a strong mismatch to the antenna impedance. Terminating the second antenna with any impedance sufficiently different from the matching impedance will provide an impedance mismatch and thus a reflective termination. Antennas are typically designed to match the antenna impedance directly to the system impedance of the electrical hardware which is e.g. 50 Ohms. In this case terminating the second antenna with any impedance sufficiently different from 50 Ohms will provide a reflective termination.

Referring to FIG. 1, an exemplary circuit arrangement which may be used in a dual mode UMTS/GSM mobile phone is explained further.

The UMTS/CDMA transmitter path block 101 comprises a BPF/MOD (band pass filter/modulator) circuit 102 having an input port 103 for signals from a BB (base band) circuit not shown here, a PA (amplifier or power amplifier) 104 having an input port connected to an output port of the BPF/MOD circuit 102 and having an output port 105, a circulator 106 and a load resistor 107.

The circulator 106 has a first port 108 connected to the output port 105 of the PA 104, a second port 109 representing an output port of the transmitter path block 101, and a third port 110 connected to one end of the load resistor 107. The other end of the load resistor 107 is connected to electrical ground. The half circle shaped arrow 111 indicates the direction, in which power is transferred by the circulator 106 from one of its ports to the next, which in this case is clockwise from the first to the second port and so forth.

A duplexer 112 is connected via a TX (transmit) input port 113 to the second port 109 of the circulator 106, is connected via a RX (receive) output port 114 to a receiver circuit not shown here, and is connected via an ANT (antenna) combined input/output port 115 to an UMTS antenna 116.

For transmitting signals efficiently through the transmitter path block 101 to the duplexer 112 and through the duplexer 112 to the UMTS antenna 116, the impedance of the output port 105 of the PA 104, the value of the load resistor 107, the impedances of the TX (transmit) input port 113 and the ANT (antenna) combined input/output port 115 of the duplexer 112 are all matched to the impedance of the UMTS antenna 116, which is e.g. 50 Ohms.

A switch "S1" 117 is connected with one end to the connecting line 118 between the second port 109 of the circulator 106 and the TX (transmit) input port 113 of the duplexer 112, and connected with the other end to electrical ground. Closing the switch "S1" 117 short circuits the transmit path by grounding the connecting line 118 and creates an impedance load mismatch and thus a reflective termination at the TX (transmit) input port 113 of the duplexer 112 for radiation energy received by the UMTS antenna 116. This in turn creates a reflective termination at the UMTS antenna 116 at UMTS TX frequencies.

Alternatively the switch "S1" 117 may be connected in series in between the second port 109 of the circulator 106 and the TX (transmit) input port 113 of the duplexer 112, i.e. it then becomes a part of the connecting line 118 itself. In this case a reflective termination at the TX (transmit) input port 113 of the duplexer is created by opening the switch "S1" 117 and thereby opening the connecting line 118.

The switch or switching element "S1" 117 may be implemented using a PIN-diode or a GaAs switch.

Figure 2:
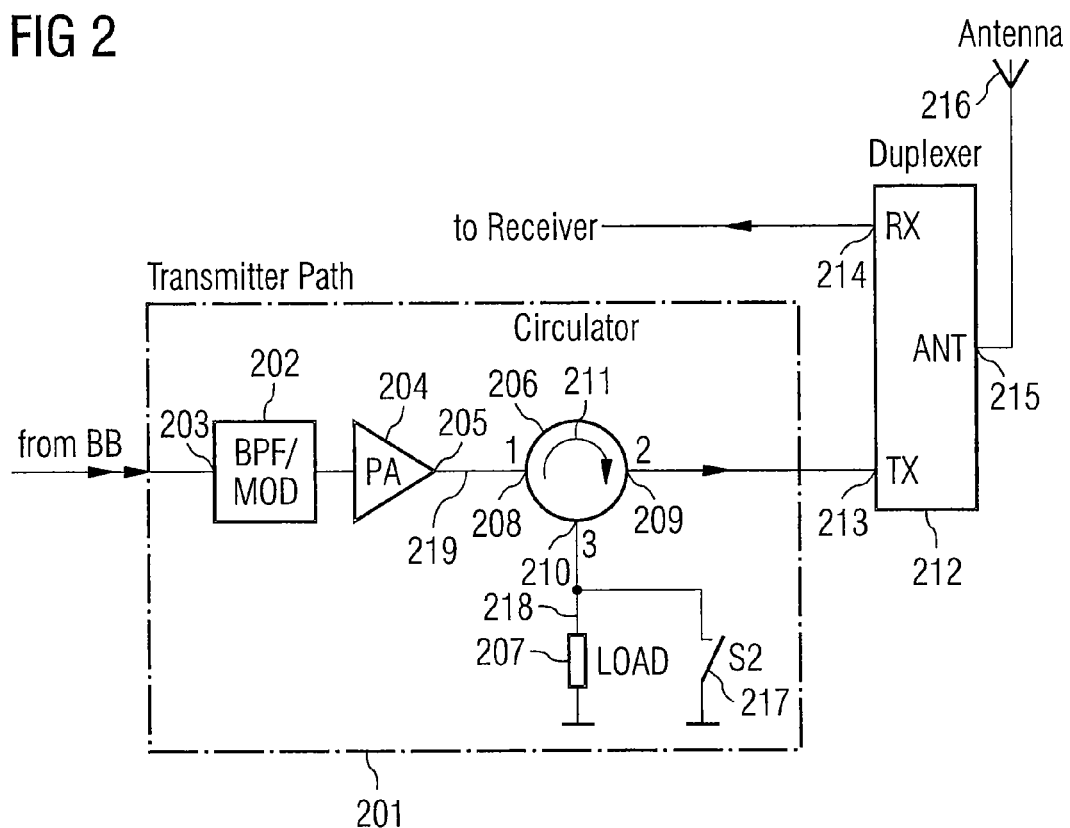
FIG. 2 shows a block diagram of another exemplary circuit arrangement having a switch to create an impedance load mismatch at the third port of the circulator.

Referring to FIG. 2, another exemplary circuit arrangement which may be used in a dual mode UMTS/GSM mobile phone is explained further.

The UMTS/CDMA transmitter path block 201 comprises a BPF/MOD (band pass filter/modulator) circuit 202 having an input port 203 for signals from a BB (base band) circuit not shown here, a PA (amplifier or power amplifier) 204 having an input port connected to an output port of the BPF/MOD circuit 202 and having an output port 205, a circulator 206 and a load resistor 207.

The circulator 206 has a first port 208 connected to the output port 205 of the PA 204, a second port 209 representing an output port of the transmitter path block 201, and a third port 210 connected to one end of the load resistor 207. The other end of the load resistor 207 is connected to electrical ground. The half circle shaped arrow 211 indicates the direction, in which power is transferred by the circulator 206 from one of its ports to the next, which in this case is clockwise from the first to the second port and so forth.

A duplexer 212 is connected via a TX (transmit) input port 213 to the second port 209 of the circulator 206, is connected via a RX (receive) output port 214 to a receiver circuit not shown here, and is connected via an ANT (antenna) combined input/output port 215 to an UMTS antenna 216.

For transmitting signals efficiently through the transmitter path block 201 to the duplexer 212 and through the duplexer 212 to the UMTS antenna 216, the impedance of the output port 205 of the PA 204, the value of the load resistor 207, the impedances of the TX (transmit) input port 213 and the ANT (antenna) combined input/output port 215 of the duplexer 212 are all matched to the impedance of the UMTS antenna 216, which is e.g. 50 Ohms.

A switch "S2" 217 is connected with one end to the connecting line 218 between the third port 210 of the circulator 206 and the load resistor 207, and connected with the other end to electrical ground. Closing the switch "S2" 217 short circuits the load of the circulator, i.e. the load resistor 207, by grounding the connecting line 218 and creates an impedance load mismatch and thus a reflective termination at the third port 210 of the circulator 206 for radiation energy received by the UMTS antenna 216.

Due to the properties of the circulator 206 the power is not directly reflected but transferred to the next port which is the first port 208. Creating an impedance mismatch at the first port 208 of the circulator 206 effects that the power will be transferred to the second port 209 of the circulator 206, and further back to the TX (transmit) input port 213 of the duplexer 212, since the impedances are matching here. The result is a reflective termination at the TX (transmit) input port 213 of the duplexer 212 for radiation energy received by the UMTS antenna 116. This in turn creates a reflective termination at the UMTS antenna 216 at UMTS TX frequencies.

Creating an impedance mismatch at the first port 208 of the circulator 206 may be achieved by means of the circuitry of the PA 204, i.e. by switching the PA 204 to an operating state, e.g. an idle state, where it is configured to create an impedance mismatch. It may also be achieved by opening or grounding the connecting line 219 between the output port 205 of the PA 204 and the first port 208 of the circulator 206 by an additional switch, not shown here, in analogy to the operation of the switch "S1" 117 in FIG. 1.

Alternatively the switch "S2" 217 may be connected in series in between the third port 210 of the circulator 206 and the load resistor 207, i.e. it then becomes a part of the connecting line 218 itself. In this case a reflective termination at the TX (transmit) input port 213 of the duplexer 212 is created by opening the switch "S2" 217 and thereby opening the connecting line 218.

The switch or switching element "S2" 217 may be implemented using a PIN-diode or a GaAs switch.

Calculations for modeling some properties of the circuit arrangement shown in FIG. 2 have been performed. Selecting for the circulator 206 a termination with a real impedance value of 800 Ohms without imaginary part at the first port 208, and a termination with a real impedance value of 1 Ohm without imaginary part at the third port 210, resulted in a return loss of the second port 209 of approximately 2 dB at GSM1800/GSM1900 and UMTS2100 frequencies.

Referring to FIG. 3, an exemplary method of operating a circuit arrangement or a dual mode UMTS/GSM mobile phone is explained further. A method of operating a circuit arrangement having an amplifier, a duplexer and a switch and a method of operating a dual mode UMTS/GSM mobile phone having at least one dedicated antenna for each an UMTS portion and a GSM portion, having a power amplifier in a transmitter path of the UMTS portion and having a receive/transmit duplexer in the UMTS portion are commonly described.

In the process flow chart shown in FIG. 3 a rectangle symbolizes a state or an action, a rounded rectangle symbolizes a starting point or an ending point of the process flow, and a rhombus symbolizes a node or nodal point having several possible paths for continuing the process.

The process flow begins with the start "Start" 301. In the node "Current status?" 302 it is decided whether the amplifier is in an active state or is in an idle state, and whether the process is to be continued at all. If the process is not to be continued, the end "End" 303 of the process flow is reached via the path 304.

If the amplifier is in an active state, the path "active" 305 is entered and leads to the action "Apply amplifier signal to duplexer" 306. In case of the circuit arrangement a signal is applied from an output port of the amplifier with matching impedance load to an input port of the duplexer. In case of the mobile phone a signal is applied from an output port of the amplifier with matching impedance load to an input port of the duplexer, and a signal is applied from a combined input/output port of the duplexer to the dedicated UMTS antenna.

If the amplifier is in an idle state, the path "idle" 307 is entered and leads to the action "Create impedance mismatch at duplexer" 308. In both the case of the circuit arrangement and the case of the mobile phone an impedance load mismatch at the input port of the duplexer is created independent of the impedance of the output port of the amplifier by switching a switch and thereby acting on a connecting line between the output port of the amplifier and the input port of the duplexer. The term "acting on a connecting line" means that the connecting line may be opened or may be grounded or may be switched to exhibit any substantially higher or lower resistance than before or may be effected in any other way which results in creating the impedance load mismatch.

After the action "Apply amplifier signal to duplexer" 306 or the action "Create impedance mismatch at duplexer" 308 have been carried out, the process is continued with the node "Current status?" 302 again via the path 309 or the path 310, respectively.

Referring to FIG. 4, another exemplary method of operating a circuit arrangement or a dual mode UMTS/GSM mobile phone is explained further. A method of operating a circuit arrangement having an amplifier, a circulator and a switch and a method of operating a dual mode UMTS/GSM mobile phone having at least one dedicated antenna for each an UMTS portion and a GSM portion, having a power amplifier and a circulator in a transmitter path of the UMTS portion are commonly described.

In the process flow chart shown in FIG. 4 a rectangle symbolizes a state or an action, a rounded rectangle symbolizes a starting point or an ending point of the process flow, and a rhombus symbolizes a node or nodal point having several possible paths for continuing the process.

The process flow begins with the start "Start" 401. In the node "Current status?" 402 it is decided whether the amplifier is in an active state or is in an idle state, and whether the process is to be continued at all. If the process is not to be continued, the end "End" 403 of the process flow is reached via the path 404.

If the amplifier is in an active state, the path "active" 405 is entered and leads to the action "Apply amplifier signal to circulator" 406. In case of the circuit arrangement a signal is applied from an output port of the amplifier to a first port of the circulator and through the circulator to a second port of the circulator, whereby the second port is configured to couple to an antenna and a third port of the circulator is coupled to a load resistor configured to match the impedance of an antenna to couple to the second port of the circulator. In case of the mobile phone a signal is applied with matching impedance load from an output port of the amplifier to a first port of the circulator, through the circulator to a second port of the circulator and from the second port to the UMTS antenna, whereby a third port of the circulator is coupled to a load resistor configured to match the impedance of the UMTS antenna.

If the amplifier is in an idle state, the path "idle" 407 is entered and leads to the action "Create impedance mismatch at load resistor port" 408. In both the case of the circuit arrangement and the case of the mobile phone an impedance load mismatch at the third port of the circulator is created independent of the impedance of the load resistor by switching a switch and thereby acting on a connecting line between the load resistor and the third port of the circulator. The term "acting on a connecting line" means that the connecting line may be opened or may be grounded or may be switched to exhibit any substantially higher or lower resistance than before or may be effected in any other way which results in creating the impedance load mismatch.

After the action "Apply amplifier signal to circulator" 406 or the action "Create impedance mismatch at load resistor port" 408 have been carried out, the process is continued with the node "Current status?" 402 again via the path 409 or the path 410, respectively.

In accordance with various embodiments of the invention it is achieved that the impedance of the UMTS transmit path in a dual mode UMTS/GSM mobile phone can be modified depending on the mobile phone operation mode or status, e.g. different dedicated and idle mode variants. Thus the efficiency of antennas connected to the UMTS system and to the GSM system, respectively, can be sustained, even if the antennas are closely located and operating at overlapping and contiguous frequency bands.

In accordance with various embodiments of the invention it is achieved that the system impedance of a UMTS transmit path circuit arrangement, which may or may not be incorporated in a dual mode UMTS/GSM mobile phone, is matched to the antenna impedance if the transceiver is in an active or "ON" state, and is switched to a mismatching value if the transceiver is in an idle or "OFF" state.

In accordance with various embodiments of the invention it is achieved that a UMTS transmit path architecture incorporates specific operation modes, e.g. different dedicated and idle mode variants, of a dual mode mobile phone and allows to improve antenna isolation and in turn antenna efficiency in physically compact dual antenna systems.

In accordance with various embodiments of the invention it is achieved that the overall system performance of a dual mode mobile phone and moreover the general advantages of the dual antenna concept for dual mode mobile platforms can be maintained even for very compact mobile phone applications.

What is claimed is:

1. A circuit arrangement, comprising:
an amplifier having an output port;
a duplexer having an input port coupled to the output port of the amplifier and having a combined input/output port to be coupled to an antenna; and
a switch configured to create an impedance load mismatch at the input port of the duplexer, that is independent of the impedance of the output port of the amplifier by acting on a connecting line between the output port of the amplifier and the input port of the duplexer, thereby creating a reflective termination of the input port of the duplexer.

2. The circuit arrangement as recited in claim 1, wherein the switch is configured to create the impedance load mismatch by opening the connecting line.

3. The circuit arrangement as recited in claim 1, wherein the switch is configured to create the impedance load mismatch by grounding the connecting line.

4. The circuit arrangement as recited in claim 1, further comprising a circulator having a first port coupled to the output port of the amplifier, having a second port coupled to the input port of the duplexer, and having a third port coupled to a load resistor, the load resistor configured to match the impedance of an antenna to couple to the combined input/output port of the duplexer,
wherein the switch is configured to create the impedance load mismatch at the input port of the duplexer by acting on a connecting line between the second port of the circulator and the input port of the duplexer.

5. The circuit arrangement as recited in claim 1, wherein the amplifier is a power amplifier in a transmitter path of a wireless communication device.

6. The circuit arrangement as recited in claim 1, wherein the duplexer is a receive/transmit duplexer in a wireless communication device.

7. The circuit arrangement as recited in claim 1, configured to operate in an UMTS mobile phone.

8. The circuit arrangement as recited in claim 1, configured to operate in an UMTS portion of a dual mode UMTS/GSM mobile phone, the mobile phone comprising at least one dedicated antenna for each of the UMTS portion and a GSM portion.

9. A circuit arrangement comprising:
an amplifier having an output port;
a circulator having a first port coupled to the output port of the amplifier, having a second port to couple to an antenna, and having a third port coupled to a load resistor, the load resistor configured to match the impedance of an antenna to couple to the second port of the circulator; and
a switch configured to create an impedance load mismatch at the third port of the circulator, that is independent of the impedance of the load resistor by acting on a connecting line between the load resistor and the third port of the circulator, thereby creating a reflective termination of the third port of the circulator.

10. The circuit arrangement as recited in claim 9, wherein the switch is configured to create an impedance load mismatch by opening the connecting line.

11. The circuit arrangement as recited in claim 9, wherein the switch is configured to create an impedance load mismatch by grounding the connecting line.

12. The circuit arrangement as recited in claim 9, wherein the amplifier is configured, if it is in an active state, to match the impedance of an antenna to couple to the second port of the circulator, and, if it is in an idle state, to create an impedance load mismatch at the first port of the circulator.

13. The circuit arrangement as recited in claim 9, wherein the amplifier is a power amplifier in a transmitter path of a wireless communication device.

14. The circuit arrangement as recited in claim 9, configured to operate in an UMTS mobile phone.

15. The circuit arrangement as recited in claim 9, configured to operate in an UMTS portion of a dual mode UMTS/

GSM mobile phone, the mobile phone comprising at least one dedicated antenna for each of the UMTS portion and a GSM portion.

16. The circuit arrangement as recited in claim 9, further comprising a duplexer having an input port coupled to the second port of the circulator and having a combined input/output port to couple to an antenna.

17. A method of operating a circuit arrangement, the method comprising:
having an amplifier, a duplexer and a switch,
if the amplifier is in an active state, applying a signal from an output port of the amplifier with matching impedance load to an input port of the duplexer; and
if the amplifier is in an idle state, creating an impedance load mismatch at the input port of the duplexer, that is independent of the impedance of the output port of the amplifier by switching the switch and thereby acting on a connecting line between the output port of the amplifier and the input port of the duplexer to create a reflective termination of the input port of the duplexer.

18. The method as recited in claim 17, wherein the connecting line between the output port of the amplifier and the input port of the duplexer is opened by switching the switch.

19. The method as recited in claim 17, wherein the connecting line between the output port of the amplifier and the input port of the duplexer is grounded by switching the switch.

20. A method of operating a dual mode UMTS/GSM mobile phone, the method comprising:
having at least one dedicated antenna for each of an UMTS portion and a GSM portion, having a power amplifier in a transmitter path of the UMTS portion and having a receive/transmit duplexer in the UMTS portion,
if the amplifier is in an active state, applying a signal from an output port of the amplifier with matching impedance load to an input port of the duplexer, and applying a signal from a combined input/output port of the duplexer to the dedicated UMTS antenna; and
if the amplifier is in an idle state, creating an impedance load mismatch at the input port of the duplexer, that is independent of the impedance of the output port of the amplifier by switching a switch and thereby acting on a connecting line between the output port of the amplifier and the input port of the duplexer to create a reflective termination of the input port of the duplexer.

21. The method as recited in claim 20, whereby the connecting line between the output port of the amplifier and the input port of the duplexer is opened by switching the switch.

22. The method as recited in claim 20, whereby the connecting line between the output port of the amplifier and the input port of the duplexer is grounded by switching the switch.

23. A method of operating a circuit arrangement, the method comprising:
having an amplifier, a circulator and a switch,
if the amplifier is in an active state, applying a signal from an output port of the amplifier to a first port of the circulator and through the circulator to a second port of the circulator, whereby the second port is configured to couple to an antenna and a third port of the circulator is coupled to a load resistor configured to match the impedance of an antenna to couple to the second port of the circulator; and
if the amplifier is in an idle state, creating an impedance load mismatch at the third port of the circulator, that is independent of the impedance of the load resistor by switching the switch and thereby acting on a connecting line between the load resistor and the third port of the circulator to create a reflective termination of the third port of the circulator.

24. The method as recited in claim 23, whereby the connecting line between the load resistor and the third port of the circulator is opened by switching the switch.

25. The method as recited in claim 23, whereby the connecting line between the load resistor and the third port of the circulator is grounded by switching the switch.

* * * * *